(12) United States Patent
Discekici et al.

(10) Patent No.: US 12,420,483 B2
(45) Date of Patent: Sep. 23, 2025

(54) THREE-DIMENSIONAL PRINTING WITH PORE-PROMOTING AGENTS

(71) Applicant: Peridot Print LLC, Palo Alto, CA (US)

(72) Inventors: Emre Hiro Discekici, San Diego, CA (US); Dennis J. Schissler, San Diego, CA (US); Shannon Reuben Woodruff, San Diego, CA (US)

(73) Assignee: Peridot Print LLC, Palo Alto, CA (US)

( * ) Notice: Subject to any disclaimer, the term of this patent is extended or adjusted under 35 U.S.C. 154(b) by 56 days.

(21) Appl. No.: 18/280,638

(22) PCT Filed: Mar. 12, 2021

(86) PCT No.: PCT/US2021/022186
§ 371 (c)(1),
(2) Date: Sep. 6, 2023

(87) PCT Pub. No.: WO2022/191857
PCT Pub. Date: Sep. 15, 2022

(65) Prior Publication Data
US 2024/0300169 A1    Sep. 12, 2024

(51) Int. Cl.
*B29C 64/165*    (2017.01)
*B29C 64/291*    (2017.01)
(Continued)

(52) U.S. Cl.
CPC .......... *B29C 64/165* (2017.08); *B29C 64/291* (2017.08); *B33Y 10/00* (2014.12); *B33Y 30/00* (2014.12); *B33Y 80/00* (2014.12)

(58) Field of Classification Search
CPC ..... B29C 64/165; B29C 64/291; B33Y 10/00; B33Y 30/00; B33Y 80/00
See application file for complete search history.

(56) References Cited

U.S. PATENT DOCUMENTS 4,382,884 A   5/1983 Rohringer et al.
5,490,962 A   2/1996 Cima et al.
(Continued)

FOREIGN PATENT DOCUMENTS

AT   A144297 A   1/1999
EP   3287213 A1   2/2018
(Continued)

OTHER PUBLICATIONS

Lasman, Henry R., "Foamed Plastics", edited by Shanghai Institute of Light Industry, pp. 1-14, published by Shanghai Science and Technology Compilation Center, Apr. 1966.
(Continued)

*Primary Examiner* — Nahida Sultana
(74) *Attorney, Agent, or Firm* — Dierker & Kavanaugh, P.C.

(57) ABSTRACT

The present disclosure provides methods of three-dimensional printing, including iteratively applying individual build material layers of polymer particles having a D50 particle size from about 20 µm to about 150 µm to a build material, and based on a three-dimensional object model, selectively applying a fusing agent onto the individual build material layers to form individually patterned object layers of the three-dimensional object and selectively applying a pore-promoting agent onto the individual build material layers at a discrete location of the individually patterned object layers to form a pore-generating region therein. The method also includes exposing the build material to electromagnetic energy to provide selective heat fusing of the polymer particles and to generate and displace molten polymer leaving a localized void having a void size from about 1 mm to about 20 mm.

11 Claims, 3 Drawing Sheets

(51) Int. Cl.
    *B33Y 10/00*           (2015.01)
    *B33Y 30/00*           (2015.01)
    *B33Y 80/00*           (2015.01)

(56) References Cited

U.S. PATENT DOCUMENTS

| | | |
|---|---|---|
| 6,454,811 B1 * | 9/2002 | Sherwood ............... A61L 27/56 |
| | | 623/23.72 |
| 7,094,371 B2 | 8/2006 | Lo |
| 8,273,368 B2 | 9/2012 | Ambrosio et al. |
| 8,431,623 B2 | 4/2013 | Shim et al. |
| 8,660,825 B2 | 2/2014 | Kumar |
| 10,099,166 B2 | 10/2018 | Sakashita et al. |
| 10,183,477 B2 | 1/2019 | Dean et al. |
| 2009/0298667 A1 | 12/2009 | Addiego et al. |
| 2013/0118377 A1 | 5/2013 | Hamman et al. |
| 2013/0331927 A1 | 12/2013 | Zheng et al. |
| 2014/0308600 A1 * | 10/2014 | Chochos ............... H01M 4/886 |
| | | 429/480 |
| 2015/0291921 A1 | 10/2015 | Rives |
| 2016/0136728 A1 | 5/2016 | Srivas et al. |
| 2017/0274594 A1 | 9/2017 | Ng et al. |
| 2017/0291077 A1 | 10/2017 | Madson et al. |
| 2018/0015663 A1 | 1/2018 | Zhao et al. |
| 2018/0055643 A1 * | 3/2018 | Castro .................... A61L 27/54 |
| 2018/0126631 A1 | 5/2018 | Nauka et al. |
| 2018/0133957 A1 | 5/2018 | Ramirez Muela et al. |
| 2018/0134911 A1 | 5/2018 | Neuman |
| 2018/0272600 A1 * | 9/2018 | Shaarawi ............... B29C 64/165 |
| 2018/0354191 A1 | 12/2018 | Nauka et al. |
| 2019/0039296 A1 | 2/2019 | Prasad et al. |
| 2019/0047216 A1 | 2/2019 | Emamjomeh et al. |
| 2019/0298523 A1 | 10/2019 | Crudden et al. |
| 2019/0375688 A1 * | 12/2019 | Lin ....................... C04B 35/478 |
| 2020/0171739 A1 | 6/2020 | Dikovsky et al. |
| 2020/0283651 A1 | 9/2020 | Wright et al. |
| 2021/0001401 A1 | 1/2021 | Shaarawi et al. |
| 2022/0088855 A1 | 3/2022 | Williams et al. |

FOREIGN PATENT DOCUMENTS

| | | |
|---|---|---|
| JP | 2016-097578 A | 5/2016 |
| JP | 2017-057467 A | 3/2017 |
| KR | 10-1019186 B1 | 3/2011 |
| KR | 10-2018-0129059 A | 12/2018 |
| WO | 2005/072785 A1 | 8/2005 |
| WO | 2015/108544 A1 | 7/2015 |
| WO | 2015/139129 A1 | 9/2015 |
| WO | 2017/180118 A1 | 10/2017 |
| WO | 2017/196321 A1 | 11/2017 |
| WO | 2018/022024 A1 | 2/2018 |
| WO | 2018/093145 A1 | 5/2018 |
| WO | 2018/183803 A1 | 10/2018 |
| WO | 2019/017926 A1 | 1/2019 |
| WO | 2019/108288 A1 | 6/2019 |
| WO | 2020/251520 A1 | 12/2020 |

OTHER PUBLICATIONS

Yaqing, F., et al., "Inorganic chemical foaming agent", Auxiliary Chemistry and Technology, Jun. 30, 1997, pp. 288-291.

* cited by examiner

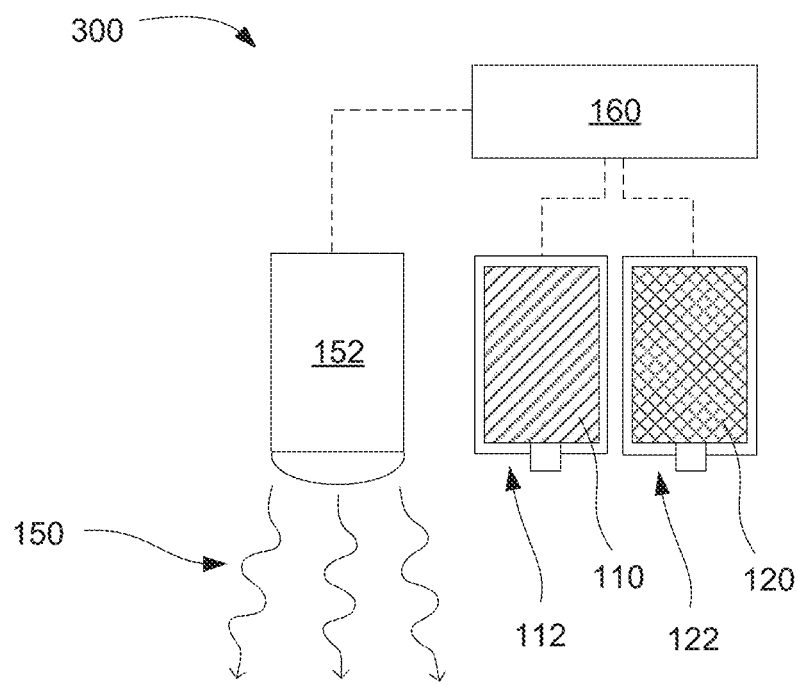
FIG. 3
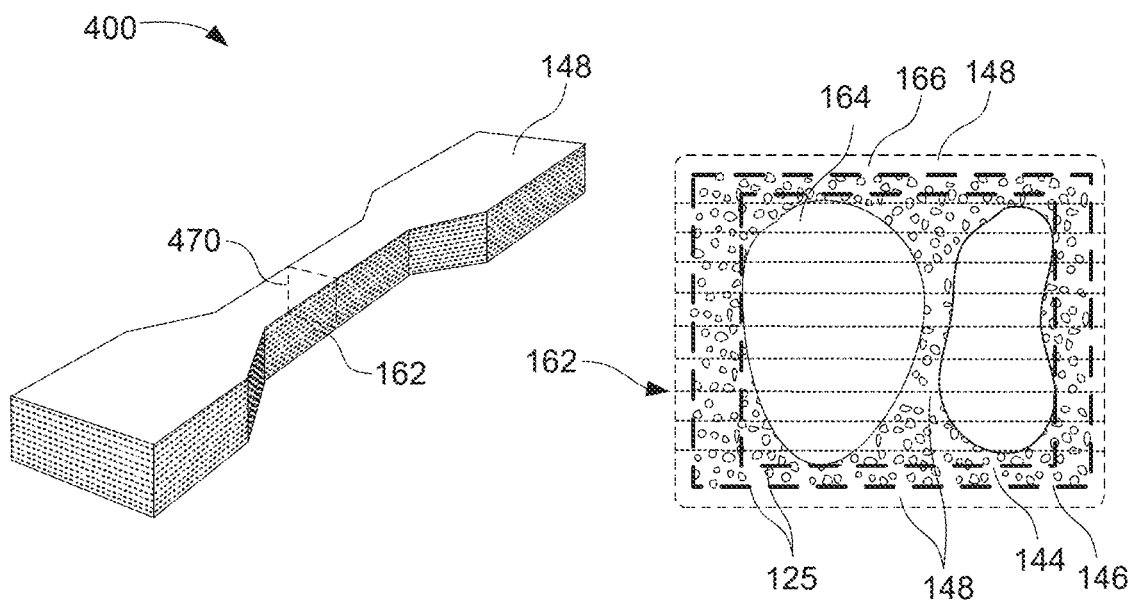
FIG. 4A
FIG. 4B

THREE-DIMENSIONAL PRINTING WITH PORE-PROMOTING AGENTS

BACKGROUND

Methods of three-dimensional (3D) digital printing, a type of additive manufacturing, have continued to be developed over the last few decades. However, systems for three-dimensional printing have historically been very expensive, though those expenses have been coming down to more affordable levels recently. In general, three-dimensional printing technology can shorten the product development cycle by allowing rapid creation of prototype models for reviewing and testing. Unfortunately, the concept has been somewhat limited with respect to commercial production capabilities because the range of materials used in three-dimensional printing is likewise limited. Accordingly, it can be difficult to three-dimensionally print functional parts with desired properties such as mechanical strength, visual appearance, and so on. Nevertheless, several commercial sectors such as aviation and the medical industry have benefitted from the ability to rapidly prototype and customize parts for customers.

BRIEF DESCRIPTION OF THE DRAWINGS

FIG. 3 depicts a schematic view of an example three-dimensional printing system in accordance with examples of the present disclosure.

FIGS. 4A-4B show an example three-dimensional printed object and a cross-section of the three-dimensional printed object in accordance with examples of the present disclosure.

DETAILED DESCRIPTION

Figure 1A:
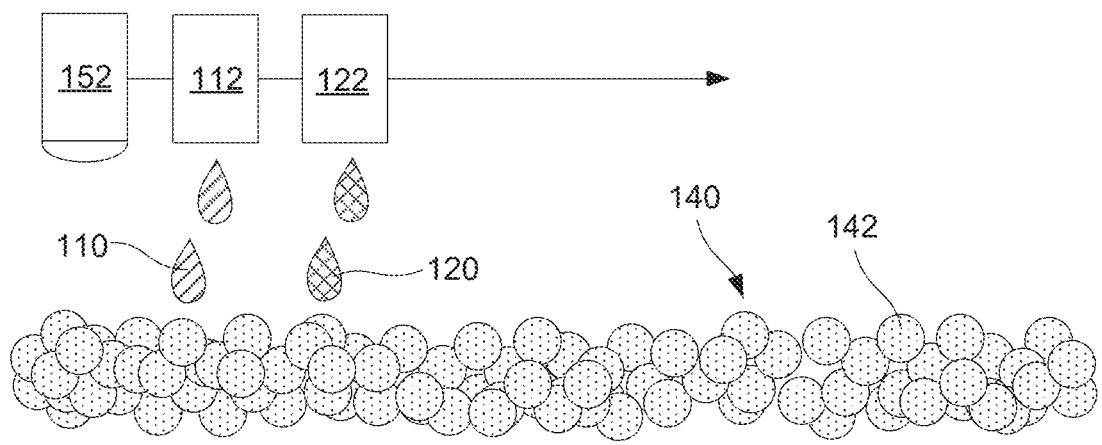
FIGS. 1A-1C show a schematic view of an example three-dimensional printing method using an example multi-fluid kit in accordance with examples of the present disclosure.

A way to modulate mechanical properties of a three-dimensional printed part or additive manufactured part without changing the polymer build material can include use of various fluid agents and/or manufacturing methods. The methods of making three-dimensional printed objects, three-dimensional printing systems, and three-dimensional printed objects disclosed herein provide for the generating of parts or articles by three-dimensional printing with added porosity, or in some examples, porous cores with solid outer shells without significant trapped powder within the pores. Furthermore, the present disclosure allows for the formation of enlarged voids that may span multiple printed layers that are located within the bulk of the three-dimensional objects. This can be accomplished by generating in sito gases during the build process.

In accordance with this, a method of making a three-dimensional printed object can include iteratively applying individual build material layers of polymer particles having a D50 particle size from about 20 μm to about 150 μm to a build material, and based on a three-dimensional object model, selectively applying a fusing agent onto the individual build material layers to form individually patterned object layers of the three-dimensional object. The fusing agent can include water and a radiation absorber. The method can further include, based on the three-dimensional object model, selectively applying a pore-promoting agent onto the individual build material layers at a discrete location of the individually patterned object layers to form a pore-generating region therein. The pore-promoting agent can include water and a pore-promoting compound that generates a gas at an elevated temperature. The method can further include exposing the build material to electromagnetic energy to provide selective heat fusing of the polymer particles in contact with the radiation absorber as the radiation absorber generates heat resulting from exposure to the electromagnetic radiation. The selective heat fusing can cause the polymer particles to form molten polymer and the pore-promoting compound at the elevated temperature can generate the gas, displacing the molten polymer and leaving a localized void having a void size from about 1 mm to about 20 mm within the three-dimensional printed object including at the discrete location upon cooling. In one example, the pore-generating region can include multiple sub-portions where different amounts of the pore-promoting agent are selectively applied. At a first sub-portion, the localized void or multiple localized voids can be formed. At a second sub-portion, the localized void is not formed, but this second sub-portion includes a plurality of pores having a D50 particle size from about 1 μm to about 500 μm. In another example, the pore-promoting compound can be a carbohydrazide, urea, a urea homologue, a carbamide-containing compound, ammonium carbonate, ammonium nitrate, ammonium nitrite, a bicarbonate, or a combination thereof. In another example, the pore-promoting compound can be present in the pore-promoting agent in an amount from about 0.5 wt % to about 10 wt % with respect to the total weight of the pore-promoting agent. In further detail, the elevated temperature at which the pore-promoting compound generates the gas can be from about 80° C. to about 250° C. In still other examples, the polymer particles can include polyamide-6, polyamide-9, polyamide-11, polyamide-12, polyamide-6,6, polyamide-6,12, thermoplastic polyamide, thermoplastic polyurethane, polyethylene, polypropylene, polyester, polycarbonate, polyether ketone, polyacrylate, polystyrene, wax, or a combination thereof; and/or the radiation absorber can include a metal dithiolene complex, carbon black, a near-infrared absorbing dye, a near-infrared absorbing pigment, metal nanoparticles, a conjugated polymer, or a combination thereof. In further detail, the pore-promoting agent can further include a second radiation absorber that also generates heat in response to exposure to the electromagnetic radiation (the second radiation absorber can be the same or different than the radiation absorber in the fusing agent).

In another example, a three-dimensional printing system can include a fusing agent applicator containing a fusing agent including water and a radiation absorber, a pore-promoting agent applicator containing a pore-promoting agent including water and a pore-promoting compound that generates a gas at an elevated temperature, and a hardware controller. The hardware controller can generate a command to direct the fusing agent applicator to iteratively and selectively apply the fusing agent to a build material forming individually patterned object layers, and direct the pore-promoting agent applicator to iteratively apply the pore-promoting agent to a discrete location within the individually patterned object layer at a concentration to generate a gas sufficient to form a localized void having a void size from about 1 mm to about 20 mm. The three-dimensional printing system can, in some examples, further include the build material, which may include from about 80 wt % to 100 wt % polymer particles having a D50 particle size from about 20 μm to about 150 μm. The system can also include an electromagnetic energy source. Thus, the hardware controller can direct the electromagnetic energy source to apply electromagnetic energy to the build material including at locations where the radiation absorber and the pore-promoting compound are applied. Application of the electromagnetic energy to the radiation absorber present at the individually pattered object layers can be sufficient to generate heat to form molten polymer. At a temperature where there is molten polymer, the pore-promoting compound can also generate the gas, displacing the molten polymer and leaving the localized void within the three-dimensional printed object, including at the discrete location upon cooling.

In another example, a three-dimensional printed object can include multiple fused polymeric layers that are also fused to one another. The multiple fused polymeric layers include cooled molten polymer with a gas-generated localized void therein. The gas-generated localized void can have a void size from about 1 mm to about 20 mm spanning multiple individual polymeric layers of the multiple fused polymeric layers. In one example, the cooled molten polymer includes polyamide-6, polyamide-9, polyamide-11, polyamide-12, polyamide-6,6, polyamide-6,12, thermoplastic polyamide, thermoplastic polyurethane, polyethylene, polypropylene, polyester, polycarbonate, polyether ketone, polyacrylate, polystyrene, wax, or a combination thereof. In another example, the localized voids can be completely within the three-dimensional printed object and are not visible on any surface thereof. In another example, the gas-generated localized void can be present in a porous region of the three-dimensional printed object that includes multiple sub-portions. A first sub-portion can include the localized void or multiple localized voids having the void size from about 1 mm to about 20 mm. A second sub-portion can be devoid of the localized void but can include a plurality of pores having a D50 particle size from about 1 μm to about 500 μm.

The methods of three-dimensional printing, the three-dimensional printing systems, and the three-dimensional printed objects described herein can be used to make three-dimensional (3D) printed objects that are porous or that have porous portions, and in particular, have enlarged pores that span multiple fused polymeric layers, e.g., from about 1 mm in size to about 20 mm in size.

In particular methods that involve three-dimensional printing using a build material of polymer particles, a pore-promoting agent can be selectively applied to the build material. A fusing agent can also be selectively applied to the build material. Generally, the fusing agent can include a radiation absorber that can absorb radiation and convert the radiation to heat. After applying the fusing agent and the pore-promoting agent, the build material can be exposed to radiation. Portions of the build material where the fusing agent was applied can heat up to the point that the polymer particles can become fused together to form a solid layer. At the same time, the heat can cause the pore-promoting compound in the pore-promoting agent to react and form a gas. In some examples, the gas can become trapped as small bubbles in the molten polymer, but in other examples, depending on the concentrations of pore-promoting agent (pore-promoting compound) and heat applied, some portions therein can generate enlarged voids that may span multiple layers of the printed three-dimensional object, e.g., void sizes ranging from about 1 mm to about 20 mm. When the polymer hardens, the bubbles can remain as pores and voids within the polymer matrix. Any size, shape, and number of porous portions can be designed and produced in the three-dimensional printed object by selectively applying the pore-promoting agent.

For clarity, the term "pores" herein is used to describe small gas-generated openings formed while build material is heated to a softened or molten state so that when a printed three-dimensional printed object becomes solidified or cooled, the small openings remain, having the appearance of solidified gas bubbles. Pores typically are distributed relatively evenly where pore-promoting agent is applied relatively evenly and have D50 particle size from about 1 μm to about 500 μm. The term "voids" or "enlarged voids," on the other hand, refers to larger gas-generated openings formed while build material is heated to a softened or molten state so that when a printed three-dimensional printed object becomes solidified or cooled, the large openings remain. These voids may be the result of many small pores being present in close proximity to one another so that they combine, and/or may be the result of large primary gas bubbles forming during formation of the printed three-dimensional object. Voids can be much larger in size and typically may span multiple layers of a fused three-dimensional object. Voids may sometimes be more sporadically distributed relative to pores and may have individual void sizes ranging from about 1 mm to about 20 mm. Notably, there may be gas-generated openings that are formed and remain within the bulk or body of the three-dimensional printed objects having a size between the size ranges provided for "pores" and "voids." Those openings are considered to be "pores" as defined herein, as the size range of pores relates to the D50 distribution of the pores, whereas voids having a size ranging from 1 mm to 20 mm are determined on an individual basis.

As used herein, "porosity" in a general context can refer to the present of pores in the fused polymer matrix. In the context of a specific value, "porosity" can be defined as the volume fraction of void space in the fused polymer with respect to the entire volume of the fused polymer together with the void space. The void space can refer to voids formed by the chemical reaction of the pore-promoting compound, and not void spaces designed into the three-dimensional model for three-dimensional printing the article in question. Any geometry designed into the three-dimensional object model can be considered features of the "entire volume of the fused polymer" and the fraction of void space can be based on the voids formed by gas generated by the pore-promoting compound. Additionally, porosity can be measured with respect to the entire three-dimensional printed object or with respect to a porous portion of the three-dimensional printed object (where the pore-promoting agent was applied). In some examples, a porous portion of a three-dimensional printed object made using the methods described herein can have a porosity from about 0.5 vol % to about 50 vol %. In further examples, the porous portion can have a porosity from about 1 vol % to about 30 vol % or from about 5 vol % to about 20 vol %.

Forming three-dimensional printed objects with the enlarged voids as described herein can be a challenge using many three-dimensional printing methods. In methods that use a build material of polymer particles, forming a three-dimensional printed object with internal closed pores has been challenging because powder build material can become trapped inside openings, e.g., voids and/or pores, with no feasible way to remove the powder after printing the article. In contrast, the methods, systems, and objects described herein can be used to form voids, pushing softened or molten polymer material outward, leaving voids (and pores where applicable) essentially free of polymer. Furthermore, adding enlarged voids using the methods described herein can affect the overall properties of the three-dimensional printed object. For example, a three-dimensional printed object can be made with voids in order to reduce the weight of the article. In another example, porosity can be introduced more generally to reduce the stiffness or strength of the article. A certain portion of the three-dimensional printed object may be made porous to make that particular portion less stiff if desired. Thus, the ability to selectively form porous portions and/or portions with enlarged voids in three-dimensional printed objects can be useful in a variety of applications.

Methods of Three-Dimensional Printing

Figure 1B:
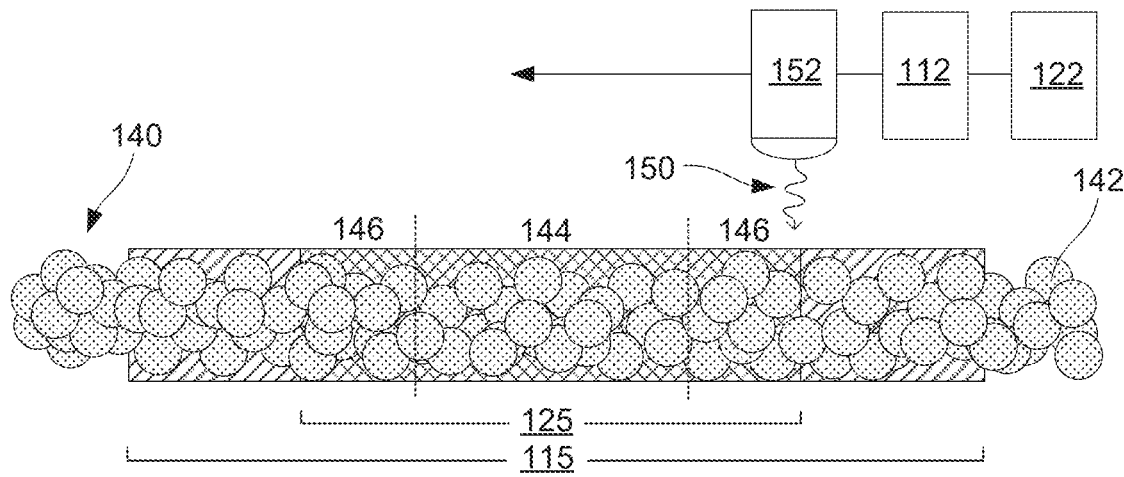
Figure 1C:
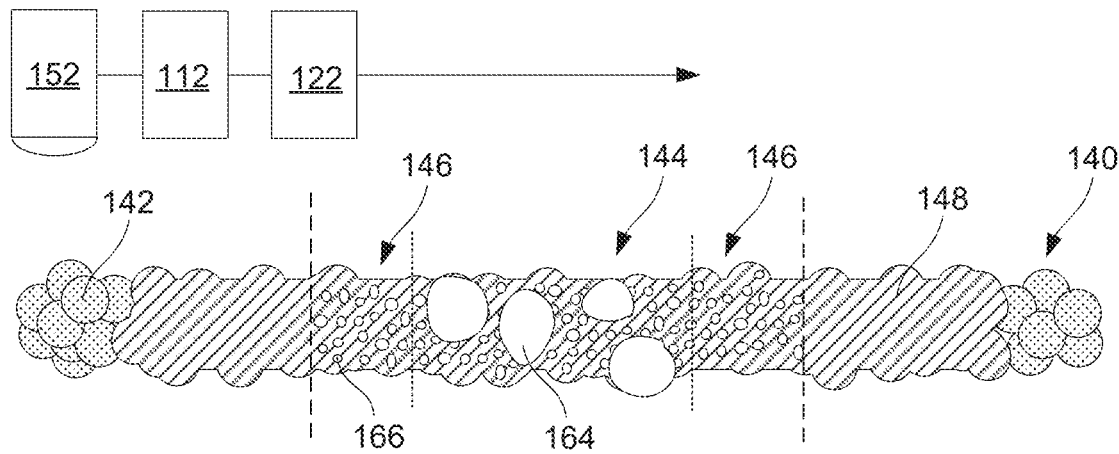

FIGS. 1A-1C illustrate one example of using various materials, such as may be present in certain materials kits, to form a three-dimensional printed object. Example materials that can be used for this example method include a fusing agent 110 and a pore-promoting agent 120. The fusing agent can include water and a radiation absorber. The radiation absorber can absorb radiation energy and convert the radiation energy to heat. The pore-promoting agent can include water and a water-soluble pore-promoting compound. The fusing agent can be applied to a build material in areas that are to be fused to form a layer of a three-dimensional printed object. The pore-promoting agent can be applied to areas of the build material where enlarged voids are to be formed. The pore-promoting agent can also be applied differently to generate smaller pores, for example. Thus, the pore-promoting agent can be used to generate both pores and voids, as defined herein. In some examples, in addition to these two fluid agents, there may be other fluid agents, such as a coloring agent, a detailing agent, a second pore-promoting agent, etc. A coloring agent can include a colorant, e.g., dye and/or pigment and an aqueous liquid vehicle. A detailing agent can include a detailing compound, which is a compound that can reduce the temperature of build material onto which the detailing agent is applied. In some examples, the detailing agent can be applied around edges of the area where the fusing agent is applied. This can prevent build material around the edges from caking due to heat from the area where the fusing agent was applied. The detailing agent can also be applied in the same area where fusing was applied in order to control the temperature and prevent excessively high temperatures when the build material is fused. Furthermore, three-dimensional printing kits can also include the build material used to form the bulk of the three-dimensional object. The build material can include polymer particles, for example. These materials are described in greater detail hereinafter.

Referring now to FIG. 1A more specifically, a fusing agent 110 and a pore-promoting agent 120 are jetted onto a layer of build material 140 including polymer particles 142. The fusing agent is jetted from a fusing agent applicator 112, which may be a fusing agent ejector, and the pore-promoting agent is jetted from a pore-promoting agent applicator 122, which may be a pore-promoting agent ejector. These fluid ejectors can move across the layer of polymer particles to selectively jet fusing agent on areas that are to be fused, while the pore-promoting agent can be jetted onto areas that are to be made porous, or can be jetted at a greater contone level of fusing compound onto areas where voids are to be formed that are larger in size than the pores that may be likewise formed. If a detailing agent or other fluid agent were to be used, there may be an additional fluid agent ejector, e.g., detailing agent ejector, coloring agent ejector, second pore-promoting agent ejector, etc. (not shown), that contains the additional respective fluid agent. Furthermore, a radiation source 152 can also move across the layer of build material.

FIG. 1B shows the layer of build material 140, which includes polymer particles 142, after the fusing agent has been jetted onto a fusing area 115 of the layer that is to be fused. Additionally, the pore-promoting agent in this example has been jetted onto a pore-generating region 125. In the specific example shown, the pore-promoting agent can be applied at different amounts or contone levels so that pore-promoting region can include a first sub-region 144 and a second sub-region 146. Furthermore, the radiation source 152 is shown emitting radiation 150 toward the layer of polymer particles. The fusing agent can include a radiation absorber that can absorb this radiation and convert the radiation energy to heat. Upon heating the polymer to a level of softening or to a molten polymer level, the pore-promoting compound can generate or be generating a gas.

FIG. 1C shows the layer of build material 140 including polymer particles 142 with a fused portion or fused polymer 148 (corresponding to 115 in FIG. 1B) where the fusing agent was jetted. This portion has reached a sufficient temperature to fuse the polymer particles together to form a solid polymer matrix or fused polymer layer. The area where the pore-promoting agent was jetted becomes a porous portion (corresponding with 125 in FIG. 1B). The porous portion includes a first sub-region 144 that includes voids 164 which are gas-generated, and a second sub-region that includes pores 166 that are also gas-generated. Notably, there can be pores present in regions where there are enlarged voids. Furthermore, as this example shows a single layer of build material, there are not enough layers present in this FIG. to show how the enlarged voids can span multiple layers. However, as this layer remains in a softened or molten state as subsequent layers are applied thereon and fused, the enlarged voids can form and span multiple layers while printing the three-dimensional object. Thus, the reaction that formed gas bubbles in the molten polymer can form pores and/or voids as the gas bubbles form within the polymer as it re-solidifies and forms a solid polymer matrix having multiple fused layers.

Figure 2:
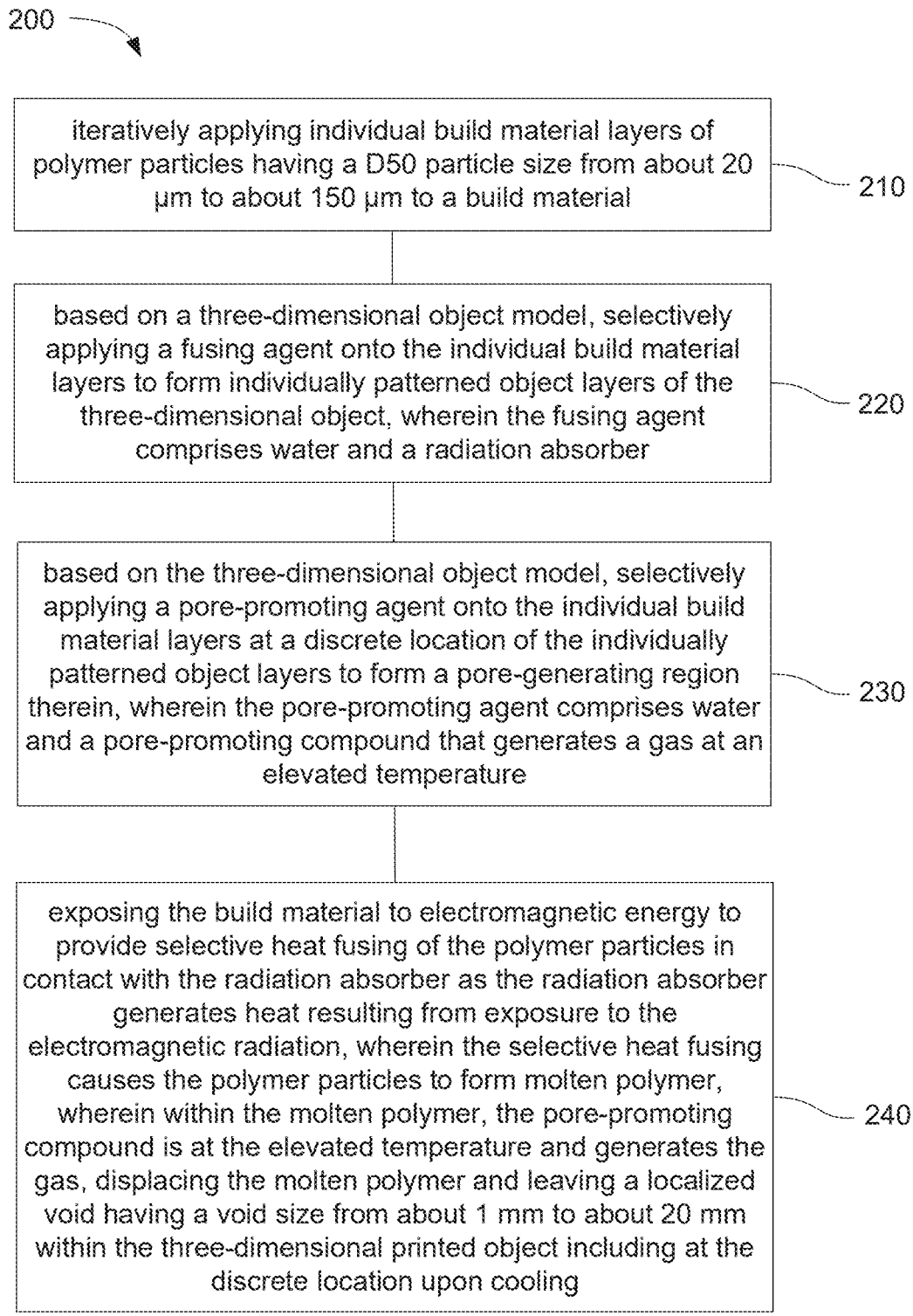
FIG. 2 is a flowchart illustrating an example method of making a three-dimensional printed object in accordance with examples of the present disclosure.

In further detail, FIG. 2 shows a flowchart illustrating one example method 200 of making a three-dimensional printed object. The method includes iteratively applying 210 individual build material layers of polymer particles having a D50 particle size from about 20 µm to about 150 µm to a build material, and based on a three-dimensional object model, selectively applying 220 a fusing agent onto the individual build material layers to form individually patterned object layers of the three-dimensional object. The fusing agent can include water and a radiation absorber. The method can further include, based on the three-dimensional object model, selectively applying 230 a pore-promoting agent onto the individual build material layers at a discrete location of the individually patterned object layers to form a pore-generating region therein. The pore-promoting agent can include water and a pore-promoting compound that generates a gas at an elevated temperature. The method can further include exposing 240 the build material to electromagnetic energy to provide selective heat fusing of the polymer particles in contact with the radiation absorber as the radiation absorber generates heat resulting from exposure to the electromagnetic radiation. The selective heat fusing can cause the polymer particles to form molten polymer and the pore-promoting compound at the elevated temperature can generate the gas, displacing the molten polymer and leaving a localized void having a void size from about 1 mm to about 20 mm within the three-dimensional printed object including at the discrete location upon cooling.

In one example, the pore-generating region can include multiple sub-portions where different amounts of the pore-promoting agent are selectively applied. At a first sub-portion, the localized void or multiple localized voids can be formed. At a second sub-portion, the localized void is not formed, but this second sub-portion includes a plurality of pores having a D50 particle size from about 1 µm to about 500 µm. In another example, the pore-promoting compound can be a carbohydrazide, urea, a urea homologue, a carbamide-containing compound, ammonium carbonate, ammonium nitrate, ammonium nitrite, a bicarbonate, or a combination thereof. In another example, the pore-promoting compound can be present in the pore-promoting agent in an amount from about 0.5 wt % to about 10 wt % with respect to the total weight of the pore-promoting agent. In further detail, the elevated temperature at which the pore-promoting compound generates the gas can be from about 80° C. to about 250° C. In still other examples, the polymer particles can include polyamide-6, polyamide-9, polyamide-11, polyamide-12, polyamide-6,6, polyamide-6,12, thermoplastic polyamide, thermoplastic polyurethane, polyethylene, polypropylene, polyester, polycarbonate, polyether ketone, polyacrylate, polystyrene, wax, or a combination thereof; and/or the radiation absorber can include a metal dithiolene complex, carbon black, a near-infrared absorbing dye, a near-infrared absorbing pigment, metal nanoparticles, a conjugated polymer, or a combination thereof. In further detail, the pore-promoting agent can further include a second radiation absorber that also generates heat in response to exposure to the electromagnetic radiation (the second radiation absorber can be the same or different than the radiation absorber in the fusing agent).

In some examples, a detailing agent can also be jetted onto the build material. As described above, the detailing agent can be a fluid that reduces the maximum temperature of the polymer particles on which the detailing agent is printed. In particular, the maximum temperature reached by the powder during exposure to electromagnetic energy can be less in the areas where the detailing agent is applied. In certain examples, the detailing agent can include a solvent that evaporates from the polymer particles to evaporatively cool the polymer particles. The detailing agent can be printed in areas of the build material where fusing is not desired. In particular examples, the detailing agent can be printed along the edges of areas where the fusing agent is printed. This can give the fused layer a clean, defined edge where the fused polymer particles end and the adjacent polymer particles remain unfused. In other examples, the detailing agent can be printed in the same area where the fusing agent is printed to control the temperature of the area to be fused. In certain examples, some areas to be fused can tend to overheat, especially in central areas of large fused sections. To control the temperature and avoid overheating (which can lead to melting and slumping of the build material), the detailing agent can be applied to these areas As mentioned above, in some examples, the elevated temperature at which the pore-promoting compound chemically reacts can be from about 80° C. to about 250° C. The pore-promoting compound, and the build material onto which the pore-promoting compound was jetted, can reach this elevated temperature when the radiation energy is applied to the build material. In some examples, the elevated temperature can be at or near the melting or softening point of the polymer particles in the build material. In other examples, the elevated temperature can be above or below the melting or softening point of the polymer particles. In any of these examples, the pore-promoting compound can be heated to a sufficient temperature to react and form a gas while the polymer particles are in a melted or softened state so that gas bubbles can form in the melted or softened polymer to form voids and pores.

Also as mentioned above, a variety of variables of the "print mode" can be adjusted to affect the level of porosity in the three-dimensional printed object. In some examples, the methods of making three-dimensional printed objects can include adjusting these variables to modify the level of porosity, or to modify the size of the gas bubbles, e.g., to generate enlarged voids in addition to any pores that are also formed. In certain examples, the variables can include the amount of fusing agent applied to the build material, the amount of pore-promoting agent applied to the build material, the thickness of individual layers of build material, the intensity and duration of radiation applied to the build material, the preheating temperature of the build material, and so on.

The fusing agent and pore-promoting agent can be jetted onto the build material using fluid jet print heads. The amount of pore-promoting agent jetted onto the powder can be calibrated based on the concentration of pore-promoting compound in the pore-promoting agent, the desired porosity of the resulting porous portion to be printed, among other factors. Similarly, the amount of the fusing agent used can be calibrated based the concentration of radiation absorber in the fusing agent, the level of fusing desired for the polymer particles, and other factors. In some examples, the amount of fusing agent printed can be sufficient to contact the radiation absorber with the entire layer of polymer particles. For example, if an individual layer of polymer particles is 100 µm thick, then the fusing agent can penetrate 100 µm into the polymer particles. Thus the fusing agent can heat the polymer particles throughout the entire layer so that the layer can coalesce and bond to the layer below. After forming a solid layer, a new layer of loose powder can be formed, either by lowering the build material or by raising the height of a powder roller and rolling a new layer of powder. As the voids formed in accordance with the present disclosure can be from about 1 mm to about 20 mm in size, the voids can span multiple layers of fused polymer matrix.

In some examples, the entire build material can be preheated to a temperature below the melting or softening point of the polymer particles. In one example, the preheat temperature can be from about 10° C. to about 30° C. below the melting or softening point. In another example, the preheat temperature can be within 50° C. of the melting or softening point. In a particular example, the preheat temperature can be from about 160° C. to about 170° C. and the polymer particles can be nylon 12 powder. In another example, the preheat temperature can be about 90° C. to about 100° C. and the polymer particles can be thermoplastic polyurethane. Preheating can be accomplished with a lamp or lamps, an oven, a heated support bed, or other types of heaters. In some examples, the entire build material can be heated to a substantially uniform temperature.

The build material can be irradiated with a fusing lamp. Suitable fusing lamps for use in the methods described herein can include commercially available infrared lamps and halogen lamps. The fusing lamp can be a stationary lamp or a moving lamp. For example, the lamp can be mounted on a track to move horizontally across the build material. Such a fusing lamp can make multiple passes over the bed depending on the amount of exposure used to coalesce the individual printed layer. The fusing lamp can be configured to irradiate the entire build material with a substantially uniform amount of energy. This can selectively coalesce the printed portions with fusing agent leaving the unprinted portions of the polymer particles below the melting or softening point.

In one example, the fusing lamp can be matched with the radiation absorber in the fusing agent so that the fusing lamp emits wavelengths of light that match the peak absorption wavelengths of the radiation absorber. A radiation absorber with a narrow peak at a particular near-infrared wavelength can be used with a fusing lamp that emits a narrow range of wavelengths at approximately the peak wavelength of the radiation absorber. Similarly, a radiation absorber that absorbs a broad range of near-infrared wavelengths can be used with a fusing lamp that emits a broad range of wavelengths. Matching the radiation absorber and the fusing lamp in this way can increase the efficiency of coalescing the polymer particles with the fusing agent printed thereon, while the unprinted polymer particles do not absorb as much light and remain at a lower temperature.

Depending on the amount of radiation absorber present in the polymer particles, the absorbance of the radiation absorber, the preheat temperature, and the melting or softening point of the polymer, an appropriate amount of irradiation can be supplied from the fusing lamp. In some examples, the fusing lamp can irradiate individual layers for from about 0.5 to about 10 seconds per pass.

The three-dimensional printed object can be formed by jetting a fusing agent onto layers of build material according to a three-dimensional object model. Three-dimensional object models can in some examples be created using computer aided design (CAD) software. Three-dimensional object models can be stored in any suitable file format. In some examples, a three-dimensional printed object as described herein can be based on a single three-dimensional object model. The three-dimensional object model can define the three-dimensional shape of the article and the three-dimensional shape of porous portions to be formed in the three-dimensional printed object. In other examples, the three-dimensional printed object can be defined by a first three-dimensional object model and the porous portions can be defined by a second three-dimensional object model. The portions where there will be voids may be defined by a third three-dimensional object model. These object models can be referred to herein collectively as "three-dimensional object model," whether there is one object model defining all of the printing functions or multiple object models used together. Other information may also be included, such as structures to be formed of additional different materials or color data for printing the article with various colors at different locations on the article. The three-dimensional object model may also include features or materials specifically related to jetting fluids on layers of build material, such as the desired amount of fluid to be applied to a given area. This information may be in the form of a droplet saturation, for example, which can instruct a three-dimensional printing system to jet a certain number of droplets of fluid into a specific area. This can allow the three-dimensional printing system to finely control radiation absorption, cooling, color saturation, concentration of the pore-promoting compound, and so on. All this information can be contained in a single three-dimensional object file or a combination of multiple files. The three-dimensional printed object can be made based on the three-dimensional object model. As used herein, "based on the three-dimensional object model" can refer to printing using a single three-dimensional object model file or a combination of multiple three-dimensional object models that together define the article. In certain examples, software can be used to convert a three-dimensional object model to instructions for a three-dimensional printer to form the article by building up individual layers of build material.

In an example of the three-dimensional printing process, a thin layer of polymer particles can be spread on a bed to form a build material. At the beginning of the process, the build material can be empty because no polymer particles have been spread at that point. For the first layer, the polymer particles can be spread onto an empty build platform. The build platform can be a flat surface made of a material sufficient to withstand the heating conditions of the three-dimensional printing process, such as a metal. Thus, "applying individual build material layers of polymer particles to a build material" includes spreading polymer particles onto the empty build platform for the first layer. In other examples, a number of initial layers of polymer particles can be spread before the printing begins. These "blank" layers of build material can in some examples number from about 10 to about 500, from about 10 to about 200, or from about 10 to about 100. In some cases, spreading multiple layers of powder before beginning the print can increase temperature uniformity of the three-dimensional printed object. A fluid jet printing head, such as an inkjet print head, can then be used to print a fusing agent including a radiation absorber over portions of the build material corresponding to a thin layer of the three-dimensional article to be formed. Then the bed can be exposed to electromagnetic energy, e.g., typically the entire bed. The electromagnetic energy can include light, infrared radiation, and so on. The radiation absorber can absorb more energy from the electromagnetic energy than the unprinted powder. The absorbed light energy can be converted to thermal energy, causing the printed portions of the powder to soften and fuse together into a formed layer. After the first layer is formed, a new thin layer of polymer particles can be spread over the build material and the process can be repeated to form additional layers until a complete three-dimensional article is printed. Thus, "applying individual build material layers of polymer particles to a build material" also includes spreading layers of polymer particles over the loose particles and fused layers beneath the new layer of polymer particles.

In certain examples, the three-dimensional printed object can be formed with porosity throughout the three-dimensional printed object, or with a porous portion of any desired shape located in any desired location within the three-dimensional printed object. Voids can be generated likewise at locations where desired. In one example, the three-dimensional printed object can have a porous interior and a solid exterior surface. For example, the three-dimensional printed object can be designed to have a solid layer or shell without any pore-promoting agent and then an interior portion where the pore-promoting agent is applied. In some examples, the solid shell can be from about 20 micrometers to about 2,000 micrometers thick, or any other desired thickness. In further examples, porosity can be formed in the three-dimensional printed object for the purpose of reducing the weight of the article, increasing buoyancy of the article, decreasing strength of the article, increasing flexibility of the article, and so on. In one example, a certain portion of the article can be made highly porous to form a breakaway segment that can be snapped apart with moderate force. In another example, a portion of the article can be made porous while other portions are non-porous, to provide for a more flexible porous segment connected to more rigid non-porous segments. In yet another example, a hidden label, code, or identification mark can be formed using the pore-promoting agent. For example, a porous portion of a particular shape can be formed in the interior of the three-dimensional printed object beneath the surface, so that the porous portion is not visible to the human eye. The porous portion can be detected using detection equipment to find or read the hidden identification label or code. In this way, a porous label or code can be used to verify authenticity of a three-dimensional printed object or to store information about the three-dimensional printed object. Besides these examples, three-dimensional printed objects with porous portions can be used for a variety of additional applications.

Three-Dimensional Printing Systems

Referring now to FIG. 3, a three-dimensional printing system 300 is shown that can include some of the same features as that shown in FIGS. 1A-1C, for example. The three-dimensional printing system of this example, however, includes a fusing agent applicator 112 containing a fusing agent 110. The fusing agent can include water and a radiation absorber, for example. The system can also include a pore-promoting agent applicator 122 containing a pore-promoting agent 120. The pore-promoting agent can include water and a pore-promoting compound that generates a gas at an elevated temperature 160 that can generate a command to direct the fusing agent applicator to iteratively and selectively apply the fusing agent to a build material forming individually patterned object layers, and direct the pore-promoting agent applicator to iteratively apply the pore-promoting agent to a discrete location within the individually patterned object layer at a concentration to generate a gas sufficient to form a localized void having a void size from about 1 mm to about 20 mm. The three-dimensional printing system can, in some examples, further include the build material (not shown, but shown in FIGS. 1A-1C), which may include from about 80 wt % to 100 wt % polymer particles having a D50 particle size from about 20 µm to about 150 µm. The system can also include an electromagnetic energy source 152. Thus, in one example, the hardware controller can direct the electromagnetic energy source to apply electromagnetic energy 150 to the build material including at locations where the radiation absorber and the pore-promoting compound are applied. The hardware controller may be the same component or a separate component for ejecting fluid(s) and/or emitting radiation, but whether there are multiple components or a single component, they can be collectively referred to as a "hardware controller." Upon application of the electromagnetic energy to the radiation absorber, individually patterned object layers of the fusing agent can generate sufficient heat to soften or form a molten polymer from the build material. At a temperature where there is molten polymer, the pore-promoting compound can also generate the gas, displacing the molten polymer and leaving the localized void (or voids) within the three-dimensional printed object, including at the discrete location upon cooling. The localized voids formed can have a size from about 1 mm to about 20 mm, from about 1.5 mm to about 10 mm, from about 5 mm to about 20 mm, or from about 2 mm to about 8 mm, for example.

Three-Dimensional Printed Objects

A three-dimensional printed object 400 is shown at FIGS. 4A-4B, and can include multiple fused polymeric layers that are also fused to one another. The multiple fused polymer layers are shown between dotted lines where there may be an interface 162 where individual three-dimensional object layers are fused together. The multiple fused polymer layers 148 can include, for example, cooled molten polymer with a gas-generated localized void(s) 164 therein. The gas-generated localized void can have a void size from about 1 mm to about 20 mm spanning multiple individual polymeric layers of the multiple fused polymeric layers. In one example, the cooled molten polymer includes polyamide-6, polyamide-9, polyamide-11, polyamide-12, polyamide-6,6, polyamide-6,12, thermoplastic polyamide, thermoplastic polyurethane, polyethylene, polypropylene, polyester, polycarbonate, polyether ketone, polyacrylate, polystyrene, wax, or a combination thereof. In another example, the localized voids can be completely within the three-dimensional printed object and are not visible on any surface thereof. In another example, the gas-generated localized void can be present in a porous region, shown generally at 125, of the three-dimensional printed object that includes multiple sub-portions. A first sub-portion 144 can include the localized void or multiple localized voids having a void size from about 1 mm to about 20 mm. A second sub-portion can be devoid of the localized void, e.g., at the area around the first sub-portion, but as shown, still includes pores having a D50 particle size from about 1 µm to about 500 µm. Notably, there can also be areas that have essentially no pores, as shown around the outermost periphery of FIG. 4B. The fuse polymer 148 is present at this peripheral area but also extends throughout the three-dimensional object.

Build Materials

In further detail regarding the build material, the polymeric particles can be present in the build material at from about 80 wt % to 100 wt %, from about 90 wt % to 100 wt %, from about 95 wt % to 100 wt %, from about 80 wt % to about 90 wt %, from about 85 wt % to about 95 wt %, or at about 100 wt %. Other particles other than the polymeric particles, if present, can be included such as filler, charging particles, flow aid particles, etc., as described in detail hereinafter.

The polymeric particles can be selected from polyacetal, polyacrylate, polyamide, polybutylene terephthalate, polycarbonate, polyester, polyether ketone, polyethylene terephthalate, polyethylene, polypropylene, polystyrene, polyurethane, thermoplastic polyamides, thermoplastic polyurethane, copolymers thereof, blends of any of the multiple polymers listed herein, as well as mixtures thereof. In one example, the polymeric particles can include a polyamide, and the polyamide can be selected from polyamide-6, polyamide-9, polyamide-11, polyamide-12, polyamide-66, polyamide-612, or a combination thereof. In yet other examples, the polymeric particles can include a polyacrylate, polybutylene terephthalate, polycarbonate, polyester, polyethylene, polystyrene, polyurethane, copolymers thereof, blends of any of the multiple polymers listed herein, as well as mixtures thereof. Core shell polymer particles of these materials may also be used. In some examples, the build material can exclude amorphous materials.

The polymeric particles (and other particles if present) of the build material can have a D50 particle size that can range from about 10 µm to about 150 µm. Polymeric particles can have a D50 particle size that can range from about 10 µm to about 150 µm, from about 10 µm to about 100 µm, from about 20 µm to about 80 µm, from about 30 µm to about 50 µm, from about 25 µm to about 75 µm, from about 40 µm to about 80 µm, from about 50 µm to about 75 µm, from about 75 µm to about 150 µm, from about 60 µm to about 90 µm, or from about 100 µm to about 150 µm, for example. The terms "size" or "particle size," as used herein, refer to the diameter of a substantially spherical particle, or the effective diameter of a non-spherical particle, e.g., the diameter of a sphere with the same mass and density as the non-spherical particle as determined by weight. Particle size information can be determined and/or verified using a scanning electron microscope (SEM), or can be measured using a particle analyzer such as a MASTERSIZER™ 3000 available from Malvern Panalytical, for example. The particle analyzer can measure particle size using laser diffraction. A laser beam can pass through a sample of particles and the angular variation in intensity of light scattered by the particles can be measured. Larger particles scatter light at smaller angles, while smaller particles scatter light at larger angles. The particle analyzer can then analyze the angular scattering data to calculate the size of the particles using the Mie theory of light scattering. Particle size can be reported as a volume equivalent sphere diameter. In some examples, the particle size ranges here can be considered to be a mathematical average of the particle sizes, which is normally about the same as the D50 particle size, but can be different depending on the particle size distribution.

That being stated, an example Gaussian-like distribution of the particles can be characterized generally using "D10," "D50," and "D90" particle size distribution values, where D10 refers to the particle size at the 10th percentile, D50 refers to the particle size at the 50th percentile, and D90 refers to the particle size at the 90th percentile. For example, a D50 value of about 25 µm means that about 50% of the particles (by number) have a particle size greater than about 25 µm and about 50% of the particles have a particle size less than about 25 µm. Particle size distribution values are not necessarily related to Gaussian distribution curves. In practice, true Gaussian distributions are not typically present, as some skewing can be present, but still, the Gaussian-like distribution can be considered to be "Gaussian" as used in practice. Particle size distribution can be expressed in terms of D50 particle size, which can approximate average particle size, but may not be the same.

A shape of the particles of the build material can be spherical, irregular spherical, rounded, semi-rounded, discoidal, angular, subangular, cubic, cylindrical, or any combination thereof. In one example, the particles can include spherical particles, irregular spherical particles, or rounded particles. In some examples, the shape of the particles can be uniform or substantially uniform, which can allow for relatively uniform melting of the particles.

The polymeric particles in the build material can have a melting point that can range from about 75° C. to about 350° C., from about 100° C. to about 300° C., or from about 150° C. to about 250° C. As examples, the build material can be a polyamide having a melting point of about 170° C. to about 190° C., or a thermoplastic polyurethane that can have a melting point ranging from about 100° C. to about 165° C. A variety of thermoplastic polymers with melting points or softening points in these ranges can be used. In a specific example, the build material can include polyamide particles, such as polyamide-12, which can have a melting point from about 175° C. to about 200° C. In another example, elastomers such as thermoplastic polyamides can be used, which may have a melting point from about 135° C. to about 210° C. in some examples.

The build material may include, in addition to the polymeric particles, other particles such as filler particles, charging particles, flow aid particles, or a combination thereof. Charging particles, for example, may be added to suppress tribo-charging. Examples of suitable charging particles include aliphatic amines (which may be ethoxylated), aliphatic amides, quaternary ammonium salts (e.g., behentrimonium chloride or cocamidopropyl betaine), esters of phosphoric acid, polyethylene glycol esters, or polyols. Some suitable commercially available charging particles include HOSTASTAT® FA 38 (natural based ethoxylated alkylamine), HOSTASTAT® FE2 (fatty acid ester), and HOSTASTAT® HS 1 (alkane sulfonate), both from Clariant Int. Ltd. (North America). In an example, if added, the charging particles can be included in an amount ranging from greater than 0 wt % to about 20 wt %, from about 0.1 wt % to about 10 wt %, or from about 0.2 to about 5 wt %, based upon the total wt % of the build material.

Flow aid particles may be added to increase the coating flowability of the build material. Flow aid particles may be particularly desirable when the particles of the build material are on the smaller end of the particle size range. The flow aid particles can increase the flowability of the build material by reducing friction, lateral drag, and tribocharge buildup (by increasing the particle conductivity). Examples of suitable flow aid particles include tricalcium phosphate (E341), powdered cellulose (E460(ii)), magnesium stearate (E470b), sodium bicarbonate (E500), sodium ferrocyanide (E535), potassium ferrocyanide (E536), calcium ferrocyanide (E538), bone phosphate (E542), sodium silicate (E550), silicon dioxide (E551), calcium silicate (E552), magnesium trisilicate (E553a), talcum powder (E553b), sodium aluminosilicate (E554), potassium aluminum silicate (E555), calcium aluminosilicate (E556), bentonite (E558), aluminum silicate (E559), stearic acid (E570), or polydimethylsiloxane (E900). In an example, if added, the flow aid particles can be included in an amount ranging from greater than 0 wt % to about 20 wt %, from about 0.1 wt % to about 10 wt %, or from about 0.2 wt % to about 5 wt %, based upon the total wt % of the build material.

Fusing Agents

The multi-fluid kits and materials kits for three-dimensional printing described herein can include a fusing agent to be applied to the polymer build material. The fusing agent can include a radiation absorber that can absorb radiant energy and convert the energy to heat. In certain examples, the fusing agent can be used with a build material in a particular three-dimensional printing process. A thin layer of build material can be formed, and then the fusing agent can be selectively applied to areas of the build material that are desired to be consolidated to become part of the solid three-dimensional printed object. The fusing agent can be applied, for example, by printing such as with a fluid ejector or fluid jet printhead. Fluid jet printheads can jet the fusing agent in a similar way to an inkjet printhead jetting ink. Accordingly, the fusing agent can be applied with great precision to certain areas of the build material that are desired to form a layer of the final three-dimensional printed object. After applying the fusing agent, the build material can be irradiated with radiant energy. The radiation absorber from the fusing agent can absorb this energy and convert it to heat, thereby heating any polymer particles in contact with the radiation absorber. An appropriate amount of radiant energy can be applied so that the area of the build material that was printed with the fusing agent heats up enough to melt the polymer particles to consolidate the objects into a solid layer, while the build material that was not printed with the fusing agent remains as a loose powder with separate particles.

In some examples, the amount of radiant energy applied, the amount of fusing agent applied to the build material, the concentration of radiation absorber in the fusing agent, and the preheating temperature of the build material (i.e., the temperature of the build material prior to printing the fusing agent and irradiating) can be tuned to ensure that the portions of the build material printed with the fusing agent will be fused to form a solid layer and the unprinted portions of the build material will remain a loose powder. These variables can be referred to as parts of the "print mode" of the three-dimensional printing system. Generally, the print mode can include any variables or parameters that can be controlled during three-dimensional printing to affect the outcome of the three-dimensional printing process.

Generally, the process of forming a single layer by applying fusing agent and irradiating the build material of the build material can be repeated with additional layers of fresh build material to form additional layers of the three-dimensional printed object, thereby building up the final object one layer at a time. In this process, the build material surrounding the three-dimensional printed object can act as a support material for the object. When the three-dimensional printing is complete, the object can be removed from the build material, e.g., build material that was not incorporated into the three-dimensional printed object, and any loose powder on the object can be removed.

Accordingly, in some examples, the fusing agent can include a radiation absorber that is capable of absorbing electromagnetic radiation to produce heat. The radiation absorber can be colored or colorless. In various examples, the radiation absorber can be a pigment such as carbon black pigment, glass fiber, titanium dioxide, clay, mica, talc, barium sulfate, calcium carbonate, a near-infrared absorbing dye, a near-infrared absorbing pigment, a conjugated polymer, a dispersant, or combinations thereof. Examples of near-infrared absorbing dyes include aminium dyes, tetraaryldiamine dyes, cyanine dyes, pthalocyanine dyes, dithiolene dyes, and others. In further examples, the radiation absorber can be a near-infrared absorbing conjugated polymer such as poly(3,4-ethylenedioxythiophene)-poly(styrenesulfonate) (PEDOT:PSS), a polythiophene, poly(p-phenylene sulfide), a polyaniline, a poly(pyrrole), a poly(acetylene), poly(p-phenylene vinylene), polyparaphenylene, or combinations thereof. As used herein, "conjugated" refers to alternating double and single bonds between atoms in a molecule. Thus, "conjugated polymer" refers to a polymer that has a backbone with alternating double and single bonds. In many cases, the radiation absorber can have a peak absorption wavelength in the range of about 800 nm to about 1400 nm.

A variety of near-infrared pigments can also be used. Non-limiting examples can include phosphates having a variety of counterions such as copper, zinc, iron, magnesium, calcium, strontium, the like, or a combination thereof. Non-limiting specific examples of phosphates can include $M_2P_2O_7$, $M_4P_2O_9$, $M_5P_2O_{10}$, $M_3(PO_4)_2$, $M(PO_3)_2$, $M_2P_4O_{12}$; or a combination thereof, where M represents a counterion having an oxidation state of +2, such as those listed above or a combination thereof. For example, $M_2P_2O_7$ can include compounds such as $Cu_2P_2O_7$, $Cu/MgP_2O_7$, $Cu/ZnP_2O_7$, or any other suitable combination of counterions. It is noted that the phosphates described herein are not limited to counterions having a +2 oxidation state. Other phosphate counterions can also be used to prepare other suitable near-infrared pigments.

Additional near-infrared pigments can include silicates. Silicates can have the same or similar counterions as phosphates. One non-limiting example can include $M_2SiO_4$, $M_2Si_2O_6$, and other silicates where M is a counterion having an oxidation state of +2. For example, the silicate $M_2Si_2O_6$ can include $Mg_2Si_2O_6$. $Mg/CaSi_2O_6$, $MgCuSizO_6$, $Cuz SizO_6$, $Cu/ZnSizO_6$, or other suitable combination of counterions. It is noted that the silicates described herein are not limited to counterions having a +2 oxidation state. Other silicate counterions can also be used to prepare other suitable near-infrared pigments.

In further examples, the radiation absorber can include a metal dithiolene complex. Transition metal dithiolene complexes can exhibit a strong absorption band in the 600 nm to 1600 nm region of the electromagnetic spectrum. In some examples, the central metal atom can be any metal that can form square planer complexes. Non-limiting specific examples include complexes based on nickel, palladium, and platinum.

A dispersant can be included in the fusing agent in some examples. Dispersants can help disperse the radiation absorbing pigments described above. In some examples, the dispersant itself can also absorb radiation. Non-limiting examples of dispersants that can be included as a radiation absorber, either alone or together with a pigment, can include polyoxyethylene glycol octylphenol ethers, ethoxylated aliphatic alcohols, carboxylic esters, polyethylene glycol ester, anhydrosorbitol ester, carboxylic amide, polyoxyethylene fatty acid amide, poly (ethylene glycol) p-isooctylphenyl ether, sodium polyacrylate, or a combination thereof.

The amount of radiation absorber in the fusing agent can vary depending on the type of radiation absorber. In some examples, the concentration of radiation absorber in the fusing agent can be from about 0.1 wt % to about 20 wt %. In one example, the concentration of radiation absorber in the fusing agent can be from about 0.1 wt % to about 15 wt %. In another example, the concentration can be from about 0.1 wt % to about 8 wt %. In yet another example, the concentration can be from about 0.5 wt % to about 2 wt %. In a particular example, the concentration can be from about 0.5 wt % to about 1.2 wt %. In one example, the radiation absorber can have a concentration in the fusing agent such that after the fusing agent is jetted onto the polymer particles, the amount of radiation absorber in the polymer particles can be from about 0.0003 wt % to about 10 wt %, or from about 0.005 wt % to about 5 wt %, with respect to the weight of the polymer particles.

In some examples, the fusing agent can be jetted onto the polymer particles of the build material using a fluid jetting device, such as inkjet printing architecture. Accordingly, in some examples, the fusing agent can be formulated to give the fusing agent good jetting performance. Ingredients that can be included in the fusing agent to provide good jetting performance can include a liquid vehicle. Thermal jetting can function by heating the fusing agent to form a vapor bubble that displaces fluid around the bubble, and thereby forces a droplet of fluid out of a jet nozzle. Thus, in some examples the liquid vehicle can include a sufficient amount of an evaporating liquid that can form vapor bubbles when heated. The evaporating liquid can be a solvent such as water, an alcohol, an ether, or a combination thereof.

In some examples, the liquid vehicle formulation can include a co-solvent or co-solvents present in total at from about 1 wt % to about 50 wt %, depending on the jetting architecture. Further, a non-ionic, cationic, and/or anionic surfactant can be present, ranging from about 0.01 wt % to about 5 wt %. In one example, the surfactant can be present in an amount from about 1 wt % to about 5 wt %. The liquid vehicle can include dispersants in an amount from about 0.5 wt % to about 3 wt %. The balance of the formulation can be purified water, and/or other vehicle components such as biocides, viscosity modifiers, materials for pH adjustment, sequestering agents, preservatives, and the like. In one example, the liquid vehicle can be predominantly water.

In some examples, a water-dispersible or water-soluble radiation absorber can be used with an aqueous vehicle. Because the radiation absorber is dispersible or soluble in water, an organic co-solvent may not be present, as it may not be included to solubilize the radiation absorber. Therefore, in some examples the fluids can be substantially free of organic solvent, e.g., predominantly water. However, in other examples a co-solvent can be used to help disperse other dyes or pigments, or enhance the jetting properties of the respective fluids. In still further examples, a non-aqueous vehicle can be used with an organic-soluble or organic-dispersible fusing agent.

In certain examples, a high boiling point co-solvent can be included in the fusing agent. The high boiling point co-solvent can be an organic co-solvent that boils at a temperature higher than the temperature of the build material during printing. In some examples, the high boiling point co-solvent can have a boiling point above about 250° C. In still further examples, the high boiling point co-solvent can be present in the fusing agent at a concentration from about 1 wt % to about 10 wt %.

Classes of co-solvents that can be used can include organic co-solvents including aliphatic alcohols, aromatic alcohols, diols, glycol ethers, polyglycol ethers, caprolactams, formamides, acetamides, and long chain alcohols. Examples of such compounds include 1-aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include, but are not limited to, 2-pyrrolidinone, N-methylpyrrolidone, 2-hydroxyethyl-2-pyrrolidone, 2-methyl-1,3-propanediol, tetraethylene glycol, 1,6-hexanediol, 1,5-hexanediol and 1,5-pentanediol.

Regarding the surfactant that may be present, a surfactant or surfactants can be used, such as alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the fusing agent may range from about 0.01 wt % to about 20 wt %. Suitable surfactants can include, but are not limited to, liponic esters such as Tergitol™ 15-S-12, Tergitol™ 15-S-7 available from Dow Chemical Company (Michigan), LEG-1 and LEG-7; Triton™ X-100; Triton™ X-405 available from Dow Chemical Company (Michigan); and sodium dodecylsulfate.

Various other additives can be employed to enhance certain properties of the fusing agent for specific applications. Examples of these additives are those added to inhibit the growth of harmful microorganisms. These additives may be biocides, fungicides, and other microbial agents, which can be used in various formulations. Examples of suitable microbial agents include, but are not limited to, NUOSEPT® (Nudex, Inc., New Jersey), UCARCIDE™ (Union carbide Corp., Texas), VANCIDE® (R.T. Vanderbilt Co., Connecticut), PROXEL® (ICI Americas, New Jersey), or a combination thereof.

Sequestering agents, such as EDTA (ethylene diamine tetra acetic acid), may be included to eliminate the deleterious effects of heavy metal impurities, and buffer solutions may be used to control the pH of the fluid. From about 0.01 wt % to about 2 wt %, for example, can be used. Viscosity modifiers and buffers may also be present, as well as other additives to modify properties of the fluid as desired. Such additives can be present at from about 0.01 wt % to about 20 wt %.

Pore-Promoting Agents

The pore-promoting agent can include a water-soluble pore-promoting compound that can chemically react at an elevated temperature to generate a gas. As used herein, "chemically react" refers to a change in chemical composition and not a mere phase change from liquid or solid to gas. Many liquid solvents can evaporate to form a gas at an elevated temperature. However, the pore-promoting compound described herein does not refer to a liquid that evaporates at the elevated temperature. Instead, the pore-promoting compound undergoes a chemical reaction to form a different compound. The product of this chemical reaction can be a gas, and the gas can remain in a gaseous state even after cooling back to room temperature. In some examples, the chemical reaction of the pore-promoting compound can proceed without any other reactants besides the pore-promoting compound. In certain examples, the pore-promoting compound can chemically decompose to form smaller molecules, and the product molecules can include a gas.

Non-limiting examples of pore-promoting compounds can include carbohydrazide, urea, a urea homologue, a carbamide-containing compound, ammonium carbonate, ammonium nitrate, ammonium nitrite, bicarbonates, or the like. As used herein, "urea homologue" can refer to methylurea and dimethylurea. These compounds can chemically decompose to form a gas when heated to a decomposition temperature. In some examples, the gas formed can include carbon dioxide gas.

In some examples, the pore-promoting agent can react to form a gas at an elevated temperature that is reached during the three-dimensional printing process. In some examples, the elevated temperature at which the pore-promoting compound reacts can be from about 80° C. to about 250° C. In further examples, the elevated temperature can be from about 80° C. to about 250° C., from about 150° C. to about 250° C., or from about 190° C. to about 240° C. In certain examples, the elevated temperature can be at or near the melting or softening point temperature of the polymer particles in the build material. For example, the elevated temperature can be within 20° C., within 15° C., or within 10° C. of the melting or softening point of the polymer particles. Thus the pore-promoting compound can react when the polymer particles are fused during the three-dimensional printing process. In other examples, the elevated temperature at which the pore-promoting compound reacts can be higher than the melting or softening point of the polymer particles. During the three-dimensional printing process, a sufficient amount of fusing agent can be applied to the polymer particles and a sufficient amount of radiation energy can be applied to heat the pore-promoting compound to the temperature at which the pore-promoting compound will react.

In some cases, the pore-promoting compound that is applied to the build material can react completely to form gas when the build material is heated during fusing of the polymer particles. In other words, all or nearly all of the pore-promoting compound can react to yield the gas. In other examples, a portion of the pore-promoting compound can react and another portion can remain unreacted. In certain examples, from about 50 wt % to about 100 wt % of the pore-promoting compound can react. In other examples, from about 60 wt % to about 95 wt % or from about 70 wt % to about 90 wt % of the pore-promoting compound can react. In still further examples, less of the pore-promoting compound can react. For example, from about 10 wt % to about 70 wt %, or from about 20 wt % to about 60 wt %, or from about 30 wt % to about 50 wt % of the pore-promoting compound can react. The amount of the pore-promoting compound that reacts can in some cases depend on the temperature to which the build material is heated, the length of time that the powder is held at that temperature, the total amount of radiation energy applied to the build material, and so on. Accordingly, in some examples, the amount of radiation energy applied, the length of time that the build material is heated, the temperature reached by the build material, the amount of fusing agent applied to the build material, and other variables can affect the extent of the reaction of the pore-promoting compound. Therefore, these variables can affect the porosity of the final three-dimensional printed object. These variables can be parts of the "print mode" of the three-dimensional printing process. The porosity can also be affected by changing the amount of pore-promoting agent that is applied to the build material. Accordingly, the print mode can be adjusted to affect the level of porosity in the three-dimensional printed object.

The total amount of pore-promoting compound that is present in the build material can directly affect the porosity of the three-dimensional printed object. As mentioned above, this variable can be adjusted by changing the amount of pore-promoting agent that is applied to the build material. Alternatively, the amount of pore-promoting compound applied to the build material can be changed by changing the concentration of pore-promoting compound in the pore-promoting agent. The amount of pore-promoting compound can be selected to allow the pore-promoting agent to be jettable from a fluid jet printhead. In certain examples, the concentration of the pore-promoting compound in the pore-promoting agent can be from about 0.5 wt % to about 30 wt % with respect to the total weight of the pore-promoting agent. In further examples, the concentration of pore-promoting compound can be from about 1 wt % to about 20 wt %, from 1 wt % to 15 wt %, from 2 wt % to 10 wt %, from about 10 wt % to about 30 wt %, or from about 5 wt % to about 25 wt %.

The pore-promoting agent can also include ingredients to allow the pore-promoting agent to be jetted by a fluid jet printhead. In some examples, the pore-promoting agent can include jettability imparting ingredients such as those in the fusing agent described above. These ingredients can include a liquid vehicle, surfactant, dispersant, co-solvent, biocides, viscosity modifiers, materials for pH adjustment, sequestering agents, preservatives, and so on. These ingredients can be included in any of the amounts described above.

Other Fluid Agents

In further examples, the methods of three-dimensional printing and the printing systems can utilize additional fluid agents as may be applicable for a given application, e.g., coloring agent, detailing agent, second pore-promoting agent, etc. For example, a coloring agent may include a colorant and an aqueous liquid vehicle. In addition to water, the aqueous liquid vehicle can include organic cosolvent, surfactant, and/or other components usable with jetting architecture, and as disclosed previously with respect to the other fluid agents described herein. As another example, a detailing agent may be used and can include a detailing compound. The detailing compound can be capable of reducing the temperature of the build material onto which the detailing agent is applied. In some examples, the detailing agent can be printed around the edges of the portion of the powder that is printed with the fusing agent. The detailing agent can increase selectivity between the fused and unfused portions of the build material by reducing the temperature of the powder around the edges of the portion to be fused.

In some examples, the detailing compound can be a solvent that evaporates at the temperature of the build material. In some cases the build material can be preheated to a preheat temperature within about 10° C. to about 70° C. of the fusing temperature of the polymer particles. Depending on the type of polymer particles used, the preheat temperature can be in the range of about 90° C. to about 200° C. or more. The detailing compound can be a solvent that evaporates when it comes into contact with the build material at the preheat temperature, thereby cooling the printed portion of the build material through evaporative cooling. In certain examples, the detailing agent can include water, co-solvents, or combinations thereof. Non-limiting examples of co-solvents for use in the detailing agent can include xylene, methyl isobutyl ketone, 3-methoxy-3-methyl-1-butyl acetate, ethyl acetate, butyl acetate, propylene glycol monomethyl ether, ethylene glycol mono tert-butyl ether, dipropylene glycol methyl ether, diethylene glycol butyl ether, ethylene glycol monobutyl ether, 3-Methoxy-3-Methyl-1-butanol, isobutyl alcohol, 1,4-butanediol, N, N-dimethyl acetamide, and combinations thereof. In some examples, the detailing agent can be mostly water. In a particular example, the detailing agent can be about 85 wt % water or more. In further examples, the detailing agent can be about 95 wt % water or more. In still further examples, the detailing agent can be substantially devoid of radiation absorbers. That is, in some examples, the detailing agent can be substantially devoid of ingredients that absorb enough radiation energy to cause the powder to fuse. In certain examples, the detailing agent can include colorants such as dyes or pigments, but in small enough amounts that the colorants do not cause the powder printed with the detailing agent to fuse when exposed to the radiation energy.

The detailing agent can also include ingredients to allow the detailing agent to be jetted by a fluid jet printhead. In some examples, the detailing agent can include jettability imparting ingredients such as those in the fusing agent described above. These ingredients can include a liquid vehicle, surfactant, dispersant, co-solvent, biocides, viscosity modifiers, materials for pH adjustment, sequestering agents, preservatives, and so on. These ingredients can be included in any of the amounts described above.

Definitions

It is noted that, as used in this specification and the appended claims, the singular forms "a," "an," and "the" include plural referents unless the context clearly dictates otherwise.

As used herein, "colorant" can include dyes and/or pigments.

As used herein, "dye" refers to compounds or molecules that absorb electromagnetic radiation or certain wavelengths thereof. Dyes can impart a visible color to an ink if the dyes absorb wavelengths in the visible spectrum.

As used herein, "pigment" generally includes pigment colorants, magnetic particles, aluminas, silicas, and/or other ceramics, organo-metallics or other opaque particles, whether or not such particulates impart color. Thus, though the present description primarily exemplifies the use of pigment colorants, the term "pigment" can be used more generally to describe pigment colorants, and also other pigments such as organometallics, ferrites, ceramics, etc. In one specific aspect, however, the pigment is a pigment colorant.

As used herein, "ink jetting" or "jetting" refers to compositions that are ejected from jetting architecture, such as ink-jet architecture. Ink-jet architecture can include thermal or piezo architecture. Additionally, such architecture can be configured to print varying drop sizes such as less than 10 picoliters, less than 20 picoliters, less than 30 picoliters, less than 40 picoliters, less than 50 picoliters, etc.

As used herein, "D50 particle size" refers to a particle size distribution where about half of the particles are larger than the D50 value and about half of the particles are smaller in size than the D50 value. This can be determined based on the diameter of the particles for spherical particles, or if not spherical, can be based on the diameter of an equivalent spherical particle by volume. The D50 particle size can be measured using a particle analyzer such as the Mastersizer™ 3000 available from Malvern Panalytical. The particle analyzer can measure particle size using laser diffraction. A laser beam can pass through a sample of particles and the angular variation in intensity of light scattered by the particles can be measured. Larger particles scatter light at smaller angles, while smaller particles scatter light at larger angles. The particle analyzer can then analyze the angular scattering data to calculate the size of the particles using the Mie theory of light scattering. The particle size can be reported as a volume equivalent sphere diameter.

As used herein, the term "substantial" or "substantially" when used in reference to a quantity or amount of a material, or a specific characteristic thereof, refers to an amount that is sufficient to provide an effect that the material or characteristic was intended to provide. The exact degree of deviation allowable may in some cases depend on the specific context. When using the term "substantial" or "substantially" in the negative, e.g., substantially devoid of a material, what is meant is from none of that material is present, or at most, trace amounts could be present at a concentration that would not impact the function or properties of the composition as a whole.

As used herein, the term "about" is used to provide flexibility to a numerical range endpoint by providing that a given value may be "a little above" or "a little below" the endpoint. The degree of flexibility of this term can be dictated by the particular variable and determined based on the associated description herein.

As used herein, a plurality of items, structural elements, compositional elements, and/or materials may be presented in a common list for convenience. However, these lists should be construed as though individual members of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include the numerical values explicitly recited as the limits of the range, and also to include individual numerical values or sub-ranges encompassed within that range as if a numerical value and sub-range is explicitly recited. As an illustration, a numerical range of "about 1 wt % to about 5 wt %" should be interpreted to include the explicitly recited values of about 1 wt % to about 5 wt %, and also to include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

EXAMPLES

The following illustrates examples of the present disclosure. However, it is to be understood that the following are merely illustrative of the application of the principles of the present disclosure. Numerous modifications and alternative devices, methods, and systems may be devised without departing from the spirit and scope of the present disclosure. The appended claims are intended to cover such modifications and arrangements.

Example 1—Materials for Printing Three-dimensional Objects

A fusing agent, pore-promoting agents, and a build material can be used to print three-dimensional objects. An example fusing agent is shown below in Table 1, and several example pore-promoting agents are shown below in Tables 2A-2C, some of which include a radiation absorber as well as the pore-promoting compound. These fluid agents can be used for printing using build material including polymer particles, such as thermoplastic polyurethane (TPU) from Lubrizol®, which is a block copolymer of alternating sequences of hard segments (isocyanate) and soft segments (reacted polyol). The isocyanes can be aliphatic or aromatic, depending on the specific TPU selected for use.

TABLE 1

Fusing Agent

| Ingredient | Concentration (wt %) |
|---|---|
| Carbon Black Dispersion | 5 (12.8 wt % pigment particles) |
| Organic Co-solvent | 5-45 |
| Surfactant | 0.01-2 |
| Chelating Agent | 0-1 |
| Biocide | 0-1 |
| Deionized Water | Balance |

TABLE 2A

Pore-promoting Agent 1 (with radiation absorber)

| Ingredient | Concentration (wt %) |
|---|---|
| Carbon Black Dispersion | 1-10 (12.8 wt % pigment particles) |
| Urea | 2-30 |
| Organic Co-solvent | 5-45 |
| Surfactant | 0.01-2 |
| Chelating Agent | 0-1 |
| Biocide | 0-1 |
| Deionized Water | Balance |

TABLE 2B

Pore-promoting Agent 2 (without radiation absorber)

| Ingredient | Concentration (wt %) |
| --- | --- |
| Urea | 2-30 |
| Organic Co-solvent | 5-45 |
| Surfactant | 0.01-2 |
| Chelating Agent | 0-1 |
| Biocide | 0-1 |
| Deionized Water | Balance |

TABLE 2C

Pore-promoting Agent 3 (without radiation absorber)

| Ingredient | Concentration (wt %) |
| --- | --- |
| Urea | 2-30 |
| Sodium bicarbonate | 0.01-0.1 |
| Organic Co-solvent | 5-40 |
| Surfactant | 0.01-2 |
| Chelating Agent | 0-1 |
| Biocide | 0-1 |
| Deionized Water | Balance |

Example 2—Formation of Pores and Enlarged Voids in Three-Dimensional Objects

Several different pore-promoting agents are prepared in accordance with Table 2A-2C above, all of which include urea as the main pore-promoting component. In some examples, urea was included at about 10 wt %. With respect to Pore-promoting Agent 1 (Table 2A, which included the radiation absorber), it was found that a variation amount of radiation absorber (carbon black pigment) as applied to the build material, e.g., 100 wt % TPU particles, did not appreciably change the density or size of pores generated upon application of about 170-200° C. of heat, even if at these temperatures for hours. However, by modifying the amount of the pore-promoting compound (urea) applied, either by increasing the concentration to from about 20 wt % to about 30 wt %, and/or by applying from about 2 times to 5 times the amount pore-promoting agent to volume of build material, gas-generated bubbles can be increased in size, and with enough urea, the gas bubbles can be forced into molten build material, displacing the build material to leave enlarged void volumes.

To illustrate, enlarged voids formed by gas generated from urea were yielded after printing onto the build material TPU using an HP industrial 4200 series three-dimensional printer. An initial CT scan of the cross section confirmed not just the presence of small micro-scale pores, but also the presence of enlarged voids. In this example, the voids became too large to be retained fully within the planned 40 mm cube size due to rapid gas generation. Thus, the cube was not able to be fully printed. However, by controlling the location and amount of the pore-promoting compound, e.g., urea, applied during the printing process, enlarged voids can be formed that are retained within the body of the printed article, provided the pore-promoting agent is placed appropriately at a concentration that provided a desired range of void sizes, e.g., from about 1 mm to about 20 mm.

Based on this demonstration and what was learned by the attempted printing of the 40 mm cube as described above, a voxel control writing systems component was used to spatially control the deposition of the pore-promoting agents, such as Pore-promoting Agents 2 and 3 shown in Tables 2B and 2C, relative to a separate Fusing Agent as shown in Table 1. With this arrangement, the active ingredient of the two fluid agents can be controlled more carefully, thus controlling coalescence gas bubbles to generate either enlarged voids and/or provide a more dispersed field of pores within a body of the three-dimensional object. For this specific example, a build material of 100 wt % polyamide-12 (PA-12) powder was used. By applying fusing agent throughout the three-dimensional printed object to generate layer-by-layer fusion, and by selectively applying the pore-promoting agent to select locations therein (where fusing agent is also applied), the parts were able to reach full completion while maintaining a high degree of porosity in the intended areas of each part.

In further detail, it was shown that to generate enlarged voids having a size from about 1 mm to about 20 mm, pore-promoting agent was applied to an interior portion of build material (without fusing agent) having about the same dimensions as the cube described previously, e.g., 40 mm cube, and then the build material was heated to form molten polymer. Large scale voids were indeed apparent based on CT scans of various cross-sectional views of the objects. In some instances, the enlarged gas-generated voids migrated to location just adjacent to where the pore-promoting agent was applied. Thus, this particular evaluation demonstrated the feasibility of generating millimeter-scale hollow voids within build material during the three-dimensional printing process described herein. For example, these voxel cube-shaped objects can be prepared using voxel control capabilities and writing systems to selectively apply agents to discrete areas of the three-dimensional printed part. Typically, to generate a part, a fusing agent can be jetted to promote fusing on a layer-by-layer basis upon application of an energy source that interacts with the radiation absorber of the fusing agent. In order to generate selective porosity within that object, the pore-promoting agent can be jetted to those specific regions. By applying additional amounts of pore-promoting agent, upon heating, larger voids can be formed.

In further detail, by loading the pore-promoting agent with a higher concentration of pore-promoting compound, such as from about 20 wt % to about 30 wt % urea (instead of about 10 wt % used to generate pores described above), upon application of the pore-promoting agent at about the same contone level, more coalescence of gas can be forced into the molten polymer resulting in the enlarged voids. Alternatively, rather than increasing the concentration of the urea in the pore-promoting agent, another approach may be to apply more pore-promoting agent (with the same or similar concentration of urea) to certain areas to result in enlarged voids, e.g., from about 2 times to about 5 times more pore-promoting agent applied to a given volume of build material can also result in the enlarged pores. A combination of these approaches can likewise be used. As a note, as previously shown above, if not controlled properly by balancing various properties, e.g., the concentration of urea, the contone level of pore-promoting agent applied, the location of application, the temperature, etc., sometimes gas bubbles may be formed that are so big that it can grow beyond the confines of the printed object. On the other hand, by applying the correct pore-promoting compound at the proper amount, considering other conditions, the enlarged voids can be formed that are retained within a body of the three-dimensional printed object.

What is claimed is:

1. A method of making a three-dimensional printed object, the method comprising:
iteratively applying individual build material layers of polymer particles having a D50 particle size from about 20 μm to about 150 μm to a build material;
based on a three-dimensional object model, selectively applying a fusing agent onto the individual build material layers to form individually patterned object layers of the three-dimensional object, wherein the fusing agent comprises water and a radiation absorber;
based on the three-dimensional object model, selectively applying controlled amounts of a pore-promoting compound onto the individual build material layers at discrete locations of the individually patterned object layers to form pore-generating regions therein, wherein the pore-promoting compound generates a gas at an elevated temperature; and
exposing the build material to electromagnetic energy to provide selective heat fusing of the polymer particles in contact with the radiation absorber as the radiation absorber generates heat resulting from exposure to the electromagnetic radiation, wherein the selective heat fusing causes the polymer particles to form molten polymer, and wherein within the molten polymer, the pore-promoting compound is at the elevated temperature and generates the gas, displacing the molten polymer and leaving i) pores in a first pore-generating region and ii) a localized void that is larger than the pores in a second pore-generating region and having a void size ranging from about 1 mm to about 20 mm within the three-dimensional printed object upon cooling.

2. The method of claim 1, wherein the have a D50 particle size ranging from about 1 μm to about 500 μm.

3. The method of claim 1, wherein the pore-promoting compound is selected from the group consisting of a carbohydrazide, urea, a urea homologue, a carbamide-containing compound, ammonium carbonate, ammonium nitrate, ammonium nitrite, a bicarbonate, and a combination thereof.

4. The method of claim 1, wherein the pore-promoting compound is present in a pore-promoting agent in an amount ranging from about 0.5 wt % to about 10 wt % with respect to the total weight of the pore-promoting agent.

5. The method of claim 1, wherein the elevated temperature at which the pore-promoting compound generates the gas ranges from about 80° C. to about 250° C.

6. The method of claim 1, wherein:
the polymer particles include polyamide-6, polyamide-9, polyamide-11, polyamide-12, polyamide-6,6, polyamide-6,12, thermoplastic polyamide, thermoplastic polyurethane, polyethylene, polypropylene, polyester, polycarbonate, polyether ketone, polyacrylate, polystyrene, wax, or a combination thereof;
the radiation absorber includes a metal dithiolene complex, carbon black, a near-infrared absorbing dye, a near-infrared absorbing pigment, metal nanoparticles, a conjugated polymer, or a combination thereof; or
both.

7. The method of claim 1, wherein the pore-promoting compound is present in a pore-promoting agent, and wherein the pore-promoting agent further includes water and a second radiation absorber that generates heat in response to exposure to the electromagnetic radiation.

8. A three-dimensional printing system for use in forming a three-dimensional printed object, the system comprising:
a build material including from about 80 wt % to 100 wt % polymer particles having a D50 particle size from about 20 μm to about 150 μm;
a fusing agent applicator containing a fusing agent including water and a radiation absorber;
a pore-promoting agent applicator containing a pore-promoting compound that generates a gas at an elevated temperature;
an electromagnetic energy source; and a hardware controller to generate a command to: direct the fusing agent applicator to iteratively and selectively apply the fusing agent to a build material forming individually patterned object layers; direct the pore-promoting agent applicator to iteratively and selectively apply controlled amounts of the pore-promoting compound to discrete locations of the individually patterned object layers; and direct the electromagnetic energy source to apply electromagnetic energy to the build material at locations where the radiation absorber and the pore-promoting compound are applied to selectively heat fuse the polymer particles of the build material in contact with the radiation absorber, wherein the selective heat fusing causes the polymer particles to form molten polymer, and wherein within the molten polymer, the pore-promoting compound generates a gas, displacing the molten polymer and leaving i) pores in a first pore-generating region and ii) a localized void that is larger than the pores in a second pore-generating region and having a void size ranging from about 1 mm to about 20 mm within the three-dimensional printed object upon cooling.

9. The three-dimensional printing system of claim 8, further comprising the build material, wherein the build material includes from about 80 wt % to 100 wt % polymer particles having a D50 particle size from about 20 μm to about 150 μm.

10. The three-dimensional printing system of claim 9, further comprising an electromagnetic energy source, wherein the hardware controller further generates a command to apply electromagnetic energy from the electromagnetic energy source to the build material at locations where the radiation absorber and the pore-promoting compound are applied.

11. The three-dimensional printing system of claim 10, wherein application of the electromagnetic energy to the radiation absorber present at the individually patterned object layers generates heat sufficient to form molten polymer, wherein at a temperature where there is molten polymer, the pore-promoting compound generates the gas, displacing the molten polymer and leaving the localized void within the three-dimensional printed object upon cooling.

* * * * *